United States Patent
Nichter

[15] 3,645,349
[45] Feb. 29, 1972

[54] DRIVE FOR A REDUCED SCALE TRACK-LAYING UTILITY VEHICLE

[72] Inventor: David E. Nichter, R.R. 2, Churubusco, Ind. 46723

[22] Filed: Jan. 5, 1970

[21] Appl. No.: 1,069

[52] U.S. Cl. ............................180/6.48, 280/5 R, 280/150 E
[51] Int. Cl. .......................................................B62d 11/04
[58] Field of Search ...............180/6.48, 6.3; 280/5 R, 5 A, 280/150 E

[56] References Cited

UNITED STATES PATENTS

| 2,994,393 | 8/1961 | Whaley | 180/6.48 |
| 3,210,122 | 10/1965 | Moon | 180/6.48 X |
| 3,385,255 | 5/1968 | Raymond et al. | 180/6.48 X |
| 2,381,109 | 8/1945 | Cartlidge | 180/6.48 |
| 2,980,193 | 4/1961 | Baudhuin et al. | 180/6.48 |

Primary Examiner—Benjamin Hersh
Assistant Examiner—John A. Pekar
Attorney—Jeffers and Richert

[57] ABSTRACT

A unique drive arrangement for a hydraulically powered tractor unit characterized by its uniform and efficient power distribution is disclosed. In a first embodiment, one pool of each of two dual spool control valves regulates the flow of hydraulic fluid between individual pumps and motors for each track of the vehicle, the second spool of each of the control valves being available to actuate accessories on the vehicle. In a second embodiment, a single pump through a dual spool valve operates the accessories while a tandem pump through individual single spool valves operates each of the drive motors.

5 Claims, 3 Drawing Figures

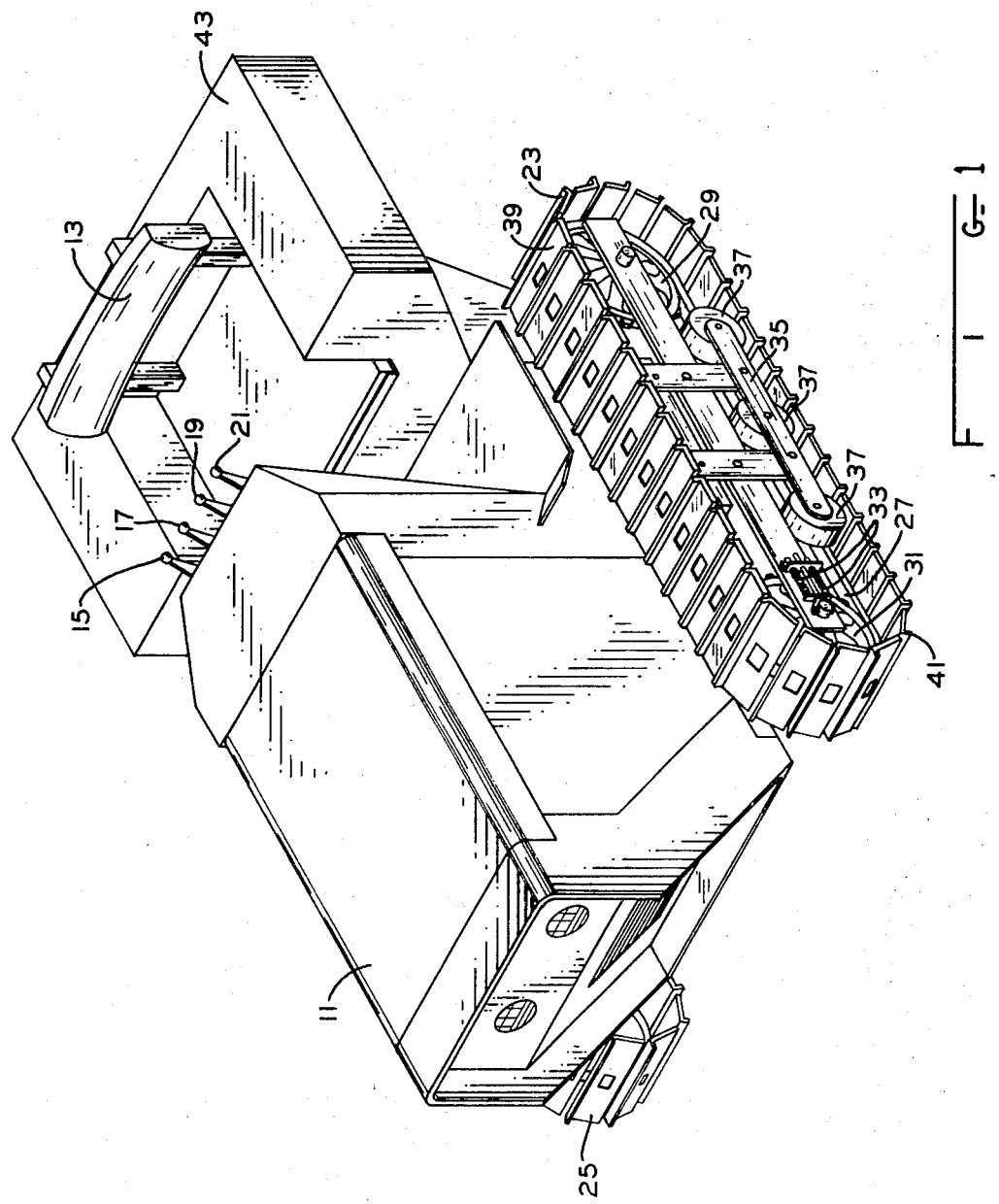

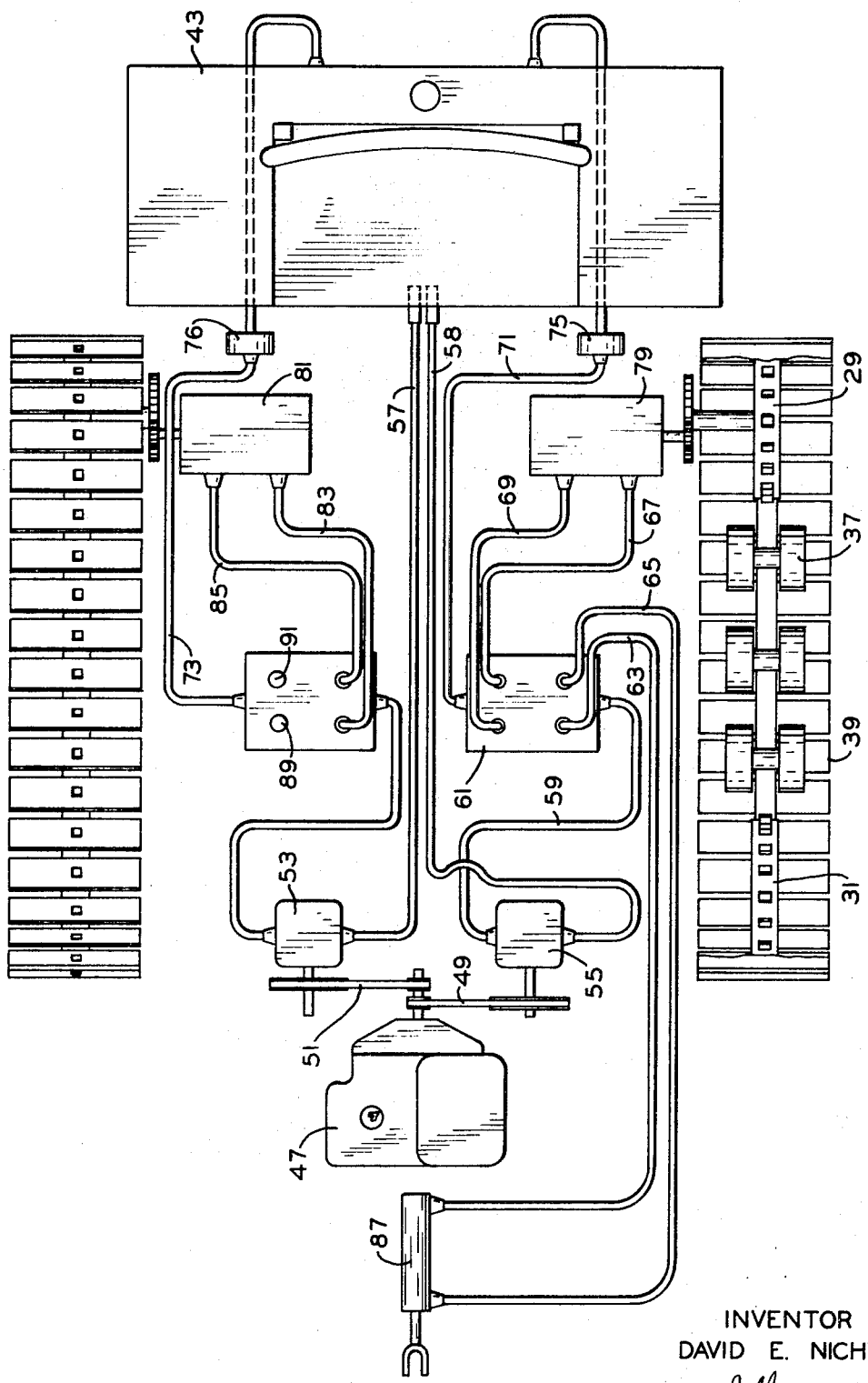

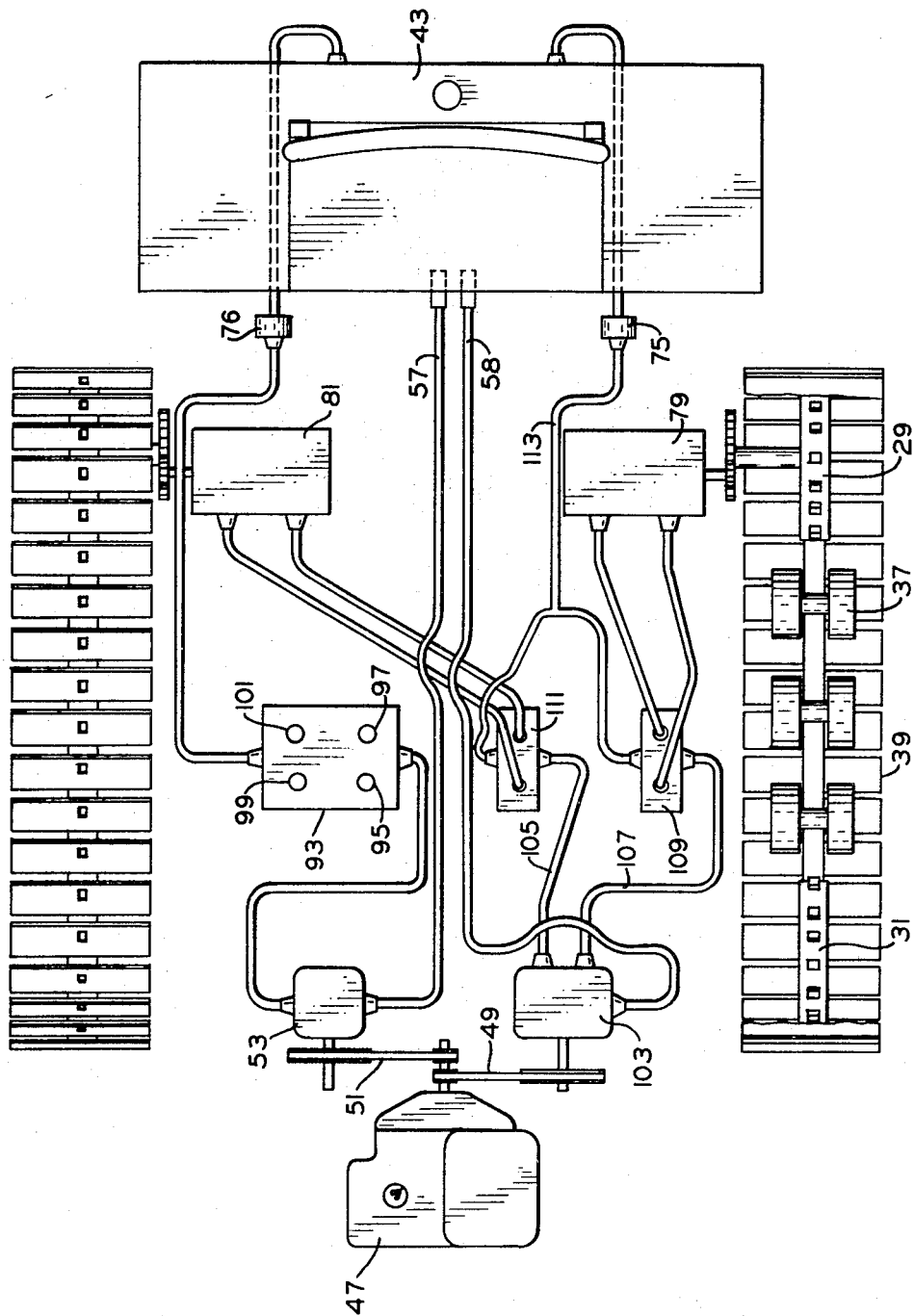

3,645,349

DRIVE FOR A REDUCED SCALE TRACK-LAYING UTILITY VEHICLE

BACKGROUND OF THE INVENTION

This invention relates to a unique drive arrangement for a hydraulically powered tractor unit and more especially to such a drive arrangement in a reduced scale track-laying utility vehicle. Hydraulic drive arrangements are of course not new and have been used for a number of years in large-scale earth-moving equipment such as common bulldozers, however, the hydraulic drive arrangements used in these large-scale machines are complex and expensive and not readily adapted to a smaller scale machine.

Small-scale utility vehicles are, of course, also known and are characterized for example by the well-known home garden tractor. These small-scale machines are typically powered by a gasoline engine and the drive arrangement consists of one or more V-belts and appropriate pulleys to transmit the energy from the engine to the wheels. Such V-belt drives are of course limited in the power which they can transmit and generally involve some slippage of the belt particularly in the clutching or gear-changing portion of the drive. Under such circumstances, the life of the belt is generally short.

The recent financial success of the snow mobile has generated several other recreational small-scale vehicles termed all-terrain vehicles (ATV). Such ATV's are designed for recreational use and are again generally belt driven and suffer from the aforementioned defects. The ATV's and garden tractors that have gone to any type of hydraulic system have done so to effect clutching and speed change but have not provided an integrated utility vehicle.

SUMMARY OF THE INVENTION

The vehicle of the present invention does not fall into any of the three above-mentioned categories. The invention is directed to a small-scale track-laying hydraulically powered tractor unit capable of pulling substantially greater loads and of operating substantially more complex and powerful auxiliary equipment than the standard garden tractor, it has only limited recreational use and this is a distinctly secondary characteristic and it is substantially smaller and more maneuverable than the bulldozer class of equipment. The vehicle of the present invention has a sprocket which drives the chain associated with each track and a spring-loaded idler sprocket associated with each track which prevents damage to the system should the sprocket and chain fail to properly mesh. The driving sprockets for each track are in turn driven by hydraulically powered motors individual to that particular sprocket. The individual motors are in turn controlled by individual control valves which receive their hydraulic energization either from separate pumps or from the two outlets on a dual outlet or tandem hydraulic pump. Hydraulic power for accessories such as a tiltable blade, back hoe, or fork lift is uniformly derived from each of the two pumps in the first instance and from a second pump in the embodiment relying on a tandem pump for the primary or motive power. Such accessories generally comprise push and lift pistons however, their precise nature is not particularly important to the present invention.

Accordingly, it is one object of the present invention to provide a uniform and efficient economical power distribution system for a small-scale hydraulically powered utility vehicle.

It is another object of the present invention to provide a hydraulically driven utility vehicle having auxiliary or accessory power readily available.

It is a further object of the present invention to provide a drive arrangement which eliminates the belt drive arrangements which characterize the prior art.

It is a still further object of the present invention to provide a versatile small-scale bulldozer which has particular utility in restricted spaces or for small jobs which do not warrant the use of a standard bulldozer.

It is a salient object of the present invention to provide a utility vehicle which has uniform drive provided to each track and which optimizes the power distribution both for the motive power of the vehicle and for the auxiliary or accessory devices.

These and other objects and advantages of the present invention will appear more clearly from the following detailed disclosure read in conjunction with the accompanying drawings in which:

BRIEF DESCRIPTION OF THE DRAWING

FIG. 1 is a perspective view of the tractor unit of the present invention;

FIG. 2 is a partially schematic diagram of the power drive arrangement in one embodiment of the present invention; and FIG. 3 is a partially schematic view of another embodiment of the power drive arrangement of the present invention.

DESCRIPTION OF THE PREFERRED EMBODIMENT

Turning first to FIG. 1, the tractor unit or crawler is seen to consist of a body indicated generally by the numeral 11 having a seat 13 to accommodate an operator and having accessible control levers 15, 17, 19 and 21. The body 11 is supported on a pair of drivable tracks 23 and 25 which are driven by a drive chain 27 and a driving sprocket wheel 29. Each of these tracks also has an idler sprocket wheel 31 which is spring-loaded by the springs 33. The spring-loading serves both to maintain the proper tension on the track and to prevent damage in the event that a stone or other bit of foreign matter becomes engaged between the chain 27 and one of the sprocket wheels 29 or 31. The tension in the spring 33 is made adjustable by use of a threaded yoke so that the proper tension may be maintained at all times. Track support is derived from a track carrier 35 which consists of a number of bogie wheels 37 held in position by means of a slide beam. The track 23 is made up of a chain 27 having a series of track shoes 39 bolted to the chain so that they may be removed to effect repair of the chain or the shoe as needed. The shoes 39 may be either flat or have one or two gripping cleats 41 as desired. FIG. 1 also illustrates the hydraulic fluid reservoir 43 symmetrically disposed about and underneath the operators seat. Clearly, two hydraulic fluid reservoirs could be symmetrically disposed on either side of the seat and connected in either series or parallel.

Turning now to FIG. 2, power for the crawler is derived from a gasoline engine 47 which may be of either the two or four cycle variety and which in one preferred embodiment was a nine to 12 horsepower engine. Two chain drives 49 and 51 are taken from the shaft of the engine 47 to drive two identical pumps 53 and 55 although a V-belt drive at this point could be utilized. The pumps 53 and 55 derive their hydraulic fluid supply in parallel from the reservoir 43 by way of the conduits 57 and 58. Due to the symmetry, the fluid path for the drive to the left or lower track will be discussed in detail in being understood that the drive for the right track functions in precisely the same manner. The outlet of the single-inlet single-outlet pump 55 is fed by way of conduit 59 to the inlet of a dual spool control valve 61. The conduits 63 and 65 are associated with the lever 21 in FIG. 1 while the conduits 67 and 69 are associated with lever 19 of FIG. 1. With levers 19 and 21 in their neutral position, the fluid flow is directly through the control valve 61 to the outlet conduit 71 which passes the hydraulic fluid through a filter 75 and back into the reservoir 43. Two reservoirs could be provided and connected in series by a conduit to provide a symmetry in the distribution of the weight and space on the vehicle, however I prefer a single large reservoir 43 which is symmetrical in configuration and can be contoured to form a portion of the operator's seat. A large reservoir having two inlets for the return of the hydraulic fluid as well as two outlets to supply the fluid to the two separate pumps is preferable and has a number of advantages over two small supply tanks connected in series and having a single inlet and a single outlet with a subsequent T to supply fluid to the individual pumps. A large oil supply provides additional weight on the rear end of the crawler and allows it to be provided with a large capacity scoop or bucket and still prevent tipping when the bucket is loaded. A large oil supply is also desirable because this hydraulic fluid may become quite hot under conditions of heavy usage. Parallel flow to and from the reservoir is desirable over a single inlet and outlet used in conjunction with T's because a more uniform and equal distribution of hydraulic fluid flow is attainable. This large tank may also be provided with baffles similar to those found in an ordinary automobile gasoline tank which will tend to maintain the oil distribution and therefore the weight in the tank at a uniform distribution.

Hydraulic motors of the type contemplated in the present invention may, for example, be purchased from Warner-Motive, a Division of Borg-Warner Corporation, having general offices in Auburn, Indiana. Hydraulic directional control valves may be purchased from Cross Manufacturing, Inc., Lewis, Kansas. Valves, motors and the other elements illustrated in block diagram form in FIGS. 2 and 3 may be purchased from Stover-Winsted Company, Inc., Indianapolis, Indiana.

Returning now to the dual spool control valve 61, if the control lever 19 is pushed forward, the hydraulic fluid enters the valve by conduit 59, passes into the conduit 69, through the motor 79, back to the control valve by way of conduit 67 and hence out of the outlet conduit 71. With the lever in this position, the motor 79 serves to drive the left track in a forward direction. If the lever 19 is now pulled back from its neutral position, oil enters the control valve by conduit 59, travels to the motor by way of conduit 67, passing through the drive motor 79 and returning to the control valve by way of conduit 69 and hence out of the control valve through conduit 71. With this reversed direction of fluid flow, the left track is driven in a reverse direction. Similar control is effected by operating the lever 17 to cause the hydraulic fluid to pass into the motor 81 selectively by way of either conduit 83 or 85 to similarly control the forward reverse drive of the right track. Thus, forward motion of the crawler is effected by pushing levers 17 and 19 forward while reverse motion of the crawler is effected by pulling these same two levers back. To turn the crawler to the right, one may elect to leave lever 17 in its neutral position and merely push lever 19 forward thus energizing only the left track or for a sharper turn, the left track may be energized in a forward direction and the right track energized in a reverse direction by pulling the lever 17 backward. Similar operations my be utilized to effect sharp or gradual left turns.

Returning again to the dual-spool control valve 61 with lever 21 in its neutral position, there is no fluid flow in either of the conduits 63 or 65, however, pushing this control lever in one direction causes a fluid flow, for example, through the pipe 63 to push or lift piston 87 and back through the conduit 65 while the reverse position of the lever causes the fluid flow to reverse and the operation of the piston 87 to change directions. If we now assume that both levers 19 and 21 are in their forward position, the fluid flow through the valve 61 will enter by way conduit 59 pass out of the valve by way of conduit 63, and reenter by way of conduit 65, again pass out of the valve by way of conduit 69 and return by way of conduit 67, and finally pass out of the control valve by way of conduit 71. Simple energy considerations will lead one to the conclusion that when the piston 87 is being operated, less energy is available from the control valve 69 to power the drive motor 79 and hence, it should be clear that it is undesirable to attempt to use a dual-spool control valve to control both of the drive motors 79 and 81. This is the reason for providing separate pumps and separate control valves for the two drive motors and for tapping off each of the control valves for the accessory or auxiliary power which typically will not be used to any extent while the crawler is moving. Thus, while the outlets 89 and 91 of the right control valve are not illustrated as actuating anything, it is anticipated that they will be similarly connected to other push or lift pistons similar to the piston 87. Under these circumstances a uniform and efficient utilization of the power available from the pumps 53 and 55 is achieved.

This straightline tracking and uniform utilization of the available power may also be achieved by the hydraulic system illustrated in FIG. 3. In FIG. 3, those portions of the hydraulic system which have the same function are denominated by the same reference numerals and only the variations from FIG. 2 will be discussed. Fluid is again supplied to the pumps by way of conduits 57 and 58 from the reservoir 43 and pump 53 is again a single-inlet single-outlet pump supplying hydraulic fluid to a dual-spool control valve 93. This dual-spool control valve has provision for actuating two auxiliary or accessory devices by way of the pair of terminals 95 and 97 and the pair 99 and 101. The outlet from the dual-spool control valve allows the fluid to flow back through the filter 76 and into one portion of the reservoir 43 as described before. The second hydraulic pump in this instance is a single-inlet dual-outlet pump 103 which provides equal energy through conduits 105 and 107 to each of two single-spool control valves 109 and 111. Each of these individual valves is in turn connected to energize one of the motors 81 and 79 to supply the motive power for the tractor. The outputs from each of the valves 109 and 111 is joined to the return conduit 113 to the filter 75. The tandem or dual-outlet pump 103 serves to provide the equal energies to the two motors 79 and 81 as discussed earlier and this embodiment would be advantageous over that discussed in respect to FIG. 2 on a piece of earth-moving equipment which required that the tracks be energized at the same time that an auxiliary or accessory item was being energized. This again, is because of the nature of the dual-spool control valves and their unequal distribution of energy when both spools are supplying energy at the same time.

The present invention provides a small-scale utility vehicle which can be operated in barns, trailer courts, between houses constructed close together, in the removal of snow from city sidewalks and service station driveways, as an aid in pipeline construction as well as of electrical and underground communication cables, in a basement or on top of large buildings during a construction process. Numerous modifications on the two embodiments disclosed will readily suggest themselves to those of ordinary skill in this art, which modifications would be within the scope and spirit of the present invention.

I claim:

1. A reduced scale track-laying hydraulically powered tractor unit comprising:

3 a body having an operator's seat adapted to accommodate an operator and having a plurality of control levers adapted to provide accessible operator control, at least one tractor accessory movably mounted on said body near one end of said tractor unit, a pair of drivable tracks adapted to support said body, and driving means supported by said body and operatively engaging said tracks to provide locomotion for said tractor unit, said driving means comprising;

a gasoline engine, a first single-inlet single-outlet pump adapted to be driven by said engine and to provide hydraulic accessory power to an accessory, a second single-inlet dual-outlet pump adapted to be driven by said engine, a pair of hydraulic motors permanently connected to drive respective ones of said pair of drivable tracks, first control means for selectively gating a fluid from one of said dual outlets to a first of said motors, second control means for selectively gating a fluid from the other of said dual outlets to the other of said motors, said first and second control means being actuated by first and second of said control levers, and fluid reservoir means for providing a fluid to both said pumps, said fluid reservoir means being symmetrically disposed about said operator seat so as to present approximately equal loads to each said track and to provide counterbalancing at the tractor unit end remote from said accessory end.

2. The tractor unit of claim 1 wherein said fluid reservoir means partially surrounds said operator seat, further comprising springlloaded idler sprocket wheels engaging said drivable tracks and adapted to maintain the proper tension on said drivable tracks and to yield when the tension on said drivable tracks exceeds a predetermined value.

3. A hydraulically driven track-laying utility vehicle comprising:
   a body having an operator's seat adapted to accommodate an operator and having a plurality of control levers adapted to provide accessible controls, a pair of drivable tracks adapted to support said body, and driving means supported by said body and operatively engaging said tracks to provide locomotion for said vehicle, said driving means comprising;
   a gasoline engine, a first single-inlet single-outlet pump adapted to be driven by said engine, a second single-inlet single-outlet pump adapted to be driven by said engine, a pair of hydraulic motors permanently connected to drive respective ones of said pair of drivable tracks, first control means for selectively gating a fluid from the outlet of said first pump to a first of said motors, second control means for selectively gating a fluid from the outlet of said second pump to a second of said motors, said first and second control means being responsive to actuation of first and second of said control levers, a reservoir for containing hydraulic fluid having inlet means and outlet means, said outlet means connected to the inlets of each said first and second pumps, said reservoir being symmetrically disposed about said operator seat near one end of said vehicle so as to present approximately equal loads to each said track and to provide counterbalancing weight at said one end of said tractor, and filter means completing said hydraulic circuit by connecting the first and second control means to said reservoir inlet means.

4. The vehicle of claim 3 wherein said reservoir partially surrounds said operator seat further comprising spring-loaded idler sprocket wheels engaging said drivable tracks and adapted to maintain the proper tension on said drivable tracks and to yield when the tension on said drivable tracks exceeds a predetermined value.

5. The vehicle of claim 4 further comprising baffle means within said reservoir for maintaining a relatively uniform distribution of fluid therein.

* * * * *